(12) United States Patent
Callens et al.

(10) Patent No.: US 11,326,029 B2
(45) Date of Patent: May 10, 2022

(54) HYBRID COMPOSITE

(71) Applicant: REIN4CED NV, Winksele (BE)

(72) Inventors: Michaël G. Callens, Leuven (BE); Niels De Greef, Steenokkerzeel (BE)

(73) Assignee: REIN4CED NV, Winksele (BE)

( * ) Notice: Subject to any disclaimer, the term of this patent is extended or adjusted under 35 U.S.C. 154(b) by 0 days.

(21) Appl. No.: 16/333,319

(22) PCT Filed: Sep. 15, 2017

(86) PCT No.: PCT/EP2017/073375
§ 371 (c)(1),
(2) Date: Mar. 14, 2019

(87) PCT Pub. No.: WO2018/050875
PCT Pub. Date: Mar. 22, 2018

(65) Prior Publication Data
US 2019/0248969 A1    Aug. 15, 2019

(30) Foreign Application Priority Data
Sep. 15, 2016 (BE) .................... 2016/5696

(51) Int. Cl.
*C08J 5/04* (2006.01)
*B29C 70/22* (2006.01)
(Continued)

(52) U.S. Cl.
CPC ............. *C08J 5/047* (2013.01); *B29C 70/08* (2013.01); *B29C 70/22* (2013.01); *B29C 70/226* (2013.01); *B32B 1/08* (2013.01); *B32B 5/02* (2013.01); *B32B 5/024* (2013.01); *B62K 19/16* (2013.01); *B62K 21/02* (2013.01); *C08J 5/041* (2013.01);
(Continued)

(58) Field of Classification Search
CPC ... C08J 5/047; C08J 5/041; C08J 5/042; C08J 5/046; C08J 2300/22; C08J 2300/24; C08J 2363/00; B29C 70/22; B29C 70/08; B29C 70/266; B32B 1/08; B32B 5/024; B32B 5/02; B32B 2260/046; B32B 2307/558; B32B 2260/023; B32B 2605/00;
(Continued)

(56) References Cited

U.S. PATENT DOCUMENTS 5,344,689 A    9/1994  Ide et al.
5,762,352 A    6/1998  Lee
(Continued)

FOREIGN PATENT DOCUMENTS

CN    101855185 A    10/2010
FR    2911317 A3    7/2008

OTHER PUBLICATIONS

Office Action from corresponding CN Application No. 201780056659. 0, dated Jul. 27, 2020.
(Continued)

*Primary Examiner* — Michael C Miggins
(74) *Attorney, Agent, or Firm* — Workman Nydegger

(57) ABSTRACT

A hybrid composite comprising a thermoplastic or thermoset matrix in which brittle and ductile fibers are present, wherein the fibers are configured such that the ductile fibers of the hybrid composite dissipate energy at a impact or overload by plastic deformation of the ductile fibers and show residual properties after impact or overload.

19 Claims, 13 Drawing Sheets

(51) Int. Cl.
| | | |
|---|---|---|
| | *B29C 70/08* | (2006.01) |
| | *B62K 19/16* | (2006.01) |
| | *B32B 1/08* | (2006.01) |
| | *B32B 5/02* | (2006.01) |
| | *B62K 21/02* | (2006.01) |
| | *B29K 305/12* | (2006.01) |
| | *B29L 31/30* | (2006.01) |

(52) U.S. Cl.
CPC ............... *C08J 5/042* (2013.01); *C08J 5/046* (2013.01); *B29K 2305/12* (2013.01); *B29L 2031/3091* (2013.01); *B32B 2260/023* (2013.01); *B32B 2260/046* (2013.01); *B32B 2307/558* (2013.01); *B32B 2605/00* (2013.01); *C08J 2300/22* (2013.01); *C08J 2300/24* (2013.01); *C08J 2363/00* (2013.01)

(58) Field of Classification Search
CPC .... B62K 19/16; B62K 21/02; B62K 2305/12; B29L 2031/3091
See application file for complete search history.

(56) References Cited

U.S. PATENT DOCUMENTS

| | | | | |
|---|---|---|---|---|
| 2006/0020074 | A1* | 1/2006 | Asada | ................. B29C 37/0075 524/494 |
| 2009/0075076 | A1 | 3/2009 | Li et al. | |
| 2014/0045400 | A1* | 2/2014 | Vandewalle | ............. C08J 5/041 442/170 |
| 2014/0335752 | A1 | 11/2014 | Ettin et al. | |

OTHER PUBLICATIONS

Bouwmeester et al., "Carbon/Dyneema Intralaminar Hybrids: New Strategy to Increase Impact Resistance or Decrease Mass of Carbon Fiber Composites," 26th Congress of International Council of the Aeronautical Sciences including the 8th AIAA Aviation Technology, Integration, and Operations (ATIO) Conference, Sep. 14-19, 2008, 7 Pages.

Breuer et al., "Carbon and Metal Fibre Reinforced Airframe Structures—A New Approach to Composite Multifunctionality," Deutshcer Luft- und Raumfahrtkongress, 2013, 6 Pages.

Callens et al., "Ductile Steel Fibre Composites with Brittle and Ductile Matrices," Composites: Part A, vol. 61, 2014, pp. 235-244.

Huang, "Crash-Resistant Carbon Fiber: Why Your Next Frame Might Just be Made of Hybrid Composites and Thermoplastics," Emporium Cycling Tips, Dec. 21, 2016, 12 Pages.

Belgian Search Report from BE Application No. 201605696, dated May 12, 2017.

International Search Report from PCT Application No. PCT/EP2017/073375, dated Nov. 20, 2017.

* cited by examiner

HYBRID COMPOSITE

FIELD OF THE INVENTION

The present invention relates to hybrid composites in which hybridization with ductile fibers, e.g. stainless steel fibers, is obtained. More particularly, the present invention relates to hybrid ductile fiber composites, e.g. stainless steel fibers based composites, which retain their integrity after impact or overload.

BACKGROUND OF THE INVENTION

Carbon fibers are feature-wise superior to steel and aluminum, both in terms of strength and stiffness by weight. For an equal weight and the same outer diameter, a carbon composite tube will theoretically be four times as rigid and strong as a steel tube. Carbon composites, however, have a number of drawbacks, which means that these high values are not achieved.

The individual carbon fibers can only be loaded under tension. As a result, the fibers must be embedded in a resin (such as epoxy) and, in addition, laid in multiple directions to get a strong construction in all directions. The epoxy also has mass but does not contribute to the strength and stiffness. Carbon fibers can not be plastically deformed but break abruptly and explosively when overloaded. Because this fragile rupture is much more dangerous than plastic deformation, higher safety margins are built into carbon composite products.

There is therefore a need for a solution to at least one of the above and other disadvantages.

SUMMARY

It is an object of embodiments of the present invention to provide hybrid composites for the production of components, for example for use in bicycles, preferably hybrid laminates, which comprise a combination of ductile and brittle fibers, both fibers having high stiffness.

It is an advantage of embodiments of the present invention to provide hybrid composites having hybridization with ductile fibers, e.g. stainless steel fibers. More particularly, the present invention relates to hybrid ductile fiber composites, e.g. stainless steel fibers, which retain their integrity after impact or overload.

The above mentioned object is accomplished by a hybrid composite according to embodiments of the present invention.

In a first aspect, the present invention relates to a hybrid composite, the hybrid composite comprising: a thermoplastic or thermoset matrix in which brittle and ductile fibers are present, characterized in that the ductile fibers are present individually or contained in a yarn having a twisting angle of less than 5° or being untwisted, the stiffness of the brittle and ductile fibers is greater than 150 GPa, the ductile fibers have a elongation at break being larger than 5%, the fibers being configured such that the ductile fibers of the hybrid composite on impact or overload dissipate energy by plastic deformation of the ductile fibers and the hybrid composite retains its integrity after impact or overload.

The composite may comprise a yarn, preferably an untwisted yarn, existing of preferably 275 or less ductile fibers, e.g. preferably 120 or less ductile fibers, such as for example preferably less than 90 ductile fibers.

The hybrid composite may, after impact or overload of at least 4 J per millimeter thickness, maintain its integrity.

According to some embodiments, the hybrid composite may maintain its integrity after impact or overload of at least 4 J per millimeter thickness in a 3 point bending test whereby both sides of the hybrid composite are clamped and whereby a span of 40 mm of the material is used.

A carbon laminate in a classical impact test (square test sample fully circularly clamped) can dissipate 5 to 10 J per mm thickness of the laminate during impact to penetration (e.g. loss of integrity). In testing of hybrid composites according to the present invention, smaller (30 mm wide) samples have been tested to accelerate loss of integrity. The impact setup is therefore a 3-point bend test with both sides clamped with a 40 mm span. In this type of test, the cracks grow faster towards the side, causing complete breakage (for example, at lower energies, carbon fiber composite will thus already lose its integrity faster). The 16 J or 4 J per mm thickness, therefore, depends on the test set-up, and is, when compared to the classic penetration test, rather on the low side.

The hybrid composite may maintain structural residual mechanical properties after impact or overload and thus can withstand a second impact or overload.

The novel hybrid laminates according to embodiments of the invention may consist of a combination of ductile and brittle fibers, both fibers comprising high stiffness. The fiber volume fraction of the ductile fibers may be less than 50% of the total amount of fibers, preferably less than 20%, for example between 3% and 10%.

The stiffness of the brittle and ductile fibers is preferably larger than 150 GPa and more specifically preferably larger than 200 GPa.

The major advantage of using (stainless) steel fibers as ductile fibers according to embodiments of the invention is that they possess intrinsically high rigidity (stiffness) (±200 GPa). This makes it possible to replace carbon fibers with steel fibers without loss of absolute rigidity. However, this will cause a weight gain which is a function of the amount of steel fibers added.

The elongation at break of the ductile fiber may be larger than 5%, preferably larger than 20%. A higher yield strength of the ductile fiber will provide a better result in the hybrid laminate. Preferably the yield strength is larger than 100 MPa, such as, for example, larger than 350 MPa.

The fibers may preferably have a diameter of less than 100 μm and preferably less than 40 μm.

The brittle and/or ductile fibers may have a rough and/or irregular surface so that they bond better to the matrix.

In embodiments, the brittle fiber is a stiff brittle fiber, for example, a rigid carbon fiber, glass fiber or a natural fiber such as, for example, a flax fiber. Preferably carbon fibers are used as a brittle fiber.

The fibers can be packed close together.

The ductile fibers may have polygonal cross-sections and fit close to each other when the ductile fibers are placed unidirectionally and realize a local high fiber volume fraction.

The ductile fibers can be placed unidirectionally in a homogeneous layer.

The brittle fibers can be placed unidirectionally in a homogeneous layer.

The ductile fibers can be provided in a fabric.

A yarn with untwisted ductile fibers can be used as weft yarn and the warp yarn can consist of an untwisted polymer yarn with a high shrinkage.

The brittle fibers can be provided in a fabric.

The ductile fibers may be provided with their longitudinal direction perpendicular to an expected cracking direction of the composite.

The brittle fibers and ductile fibers may be provided in an interlayer configuration resulting in a hybrid laminate, with at least one ductile fiber layer.

The at least one ductile fiber layer may be placed on at least one surface of the composite, i.e. where the greatest distortions can occur and where the cracks can show the largest opening.

The at least one ductile fibrous layer may be placed on at least one largest surface of hybrid composite.

The brittle fibers can be carbon fibers.

The ductile fibers can be stainless steel fibers.

The composite can be a laminate or sandwich plate.

The composite can be a tube or profile.

The curvature of the tube or profile can contribute to the integrity of the hybrid composite.

The present invention also relates to a method of making a hybrid composite as described above, the method comprising placing the brittle and ductile fibers on a mold of a certain shape;

infusing the fibers with a thermoplastic or thermoset resin to form a hybrid composite.

The present invention also relates to a method of making a hybrid composite as described above, the method comprising:

providing an object containing brittle fibers;

providing at least one ductile fiber layer to at least one surface of the object.

It is an advantage of embodiments of the present invention that existing objects possessing inferior structural mechanical properties such as, for example, carbon fiber composites, can be reinforced by providing a ductile fiber layer to at least one (large) area of the article. This can be achieved, for example, by providing a tape comprising the at least one ductile fibrous layer on the object. In the case of a tube, the tape can be provided on the outside surface and/or on the inner surface of the tube.

The method may further comprise infusing the fibers with a thermoplastic or thermoset resin to form a hybrid composite.

The present invention also relates to the use of the hybrid tube as described above as part of a bicycle frame and preferably as a bicycle fork.

The present invention also relates to the use of a tape comprising at least one ductile fibrous layer to enhance the integrity of an object comprising brittle fibers.

In embodiments of the invention, the possibilities of using steel fibers are described below. Steel fibers provide a good result because of the high stiffness. However, any rigid (>70 GPa) and ductile (elongation at break>5%) fiber may be eligible for this, such as titanium, copper and specific (highly ductile and rigid) UHMWPE variants (such as Dyneema) and aramid (such as kevlar), etc.

In embodiments of the present invention, the fibers, e.g., brittle and/or ductile fibers, preferably have a diameter of less than 100 μm, such as, for example, less than 40 μm (but this should not be at the expense of the ductility of the fibers).

In embodiments of the present invention, the fibers, e.g., brittle and/or ductile fibers, preferably have a rough and irregular surface (in view of the better bonding).

In embodiments of the present invention, the fibers, e.g. brittle and/or ductile fibers, are preferably packed closely together. In embodiments where the ductile fibers are a bundle or yarn of drawn steel, the polygonal cross sections of the ductile fibers are a kind of puzzle pieces that fit well in production in the hybrid composite according to embodiments the present invention and thus realize a locally high fiber volume fraction.

In embodiments of the present invention, the ductile fibers are preferably positioned perpendicularly to the expected crack growth (so that a crack can be bridged). Eg. in the case of a uniaxial tensile load this is in the longitudinal direction of the tensile load.

In embodiments of the invention, the ductile fibers are preferably positioned outside or on the outer surface hybrid laminate where the largest deformations can occur and where the cracks can exhibit the largest aperture.

In embodiments of the invention, the ductile fibers are provided as a layer, a ductile fibrous layer, with as little shrinkage as possible, preferably less than 5%, such as, for example, less than 0.5% (shrinkage is expressed as the percentage of the length of the yarn being longer than the length of the unit cell), and with the least twist (tension/spinning of the yarn to facilitate weaving) with fibers as closely packed as possible. In embodiments of the invention, the ductile fibers are provided quasi-unidirectionally in a preferably homogeneous layer with as little shrinkage and as little twisting as possible, resulting in a ductile fibrous layer, although embodiments are not limited thereto.

In preferred embodiments, the ductile fiber layer contains only ductile fibers and no brittle fibers. The ductile fiber layer may comprise one or more types of ductile fibers. There may also be other fibers in the ductile fibrous layer (such as untwisted polymer yarn or brittle fibers less rigid <70 GPa). The thickness of the fiber layer may vary from a single fiber thickness to a few centimeters.

In embodiments of the invention, the ductile fibers may be provided as a structure or fabric, for example a non-shrink fabric with ductile fibers.

In embodiments of the invention, where the hybrid composite is provided as a laminate, one or more ductile fibrous layers may be present. Preferably, at least one ductile fibrous layer is provided on an outer surface where a deformation can occur. In other embodiments, brittle fibrous layers and ductile fibrous layers are provide alternatingly thus forming an interlayer configuration. In still other embodiments, different, preferably thin ductile fibrous layers are spread between multiple brittle fibrous layers.

In embodiments of the invention, the ductile fibers are provided as a fabric or another structure in which the ductile fibers, e.g. steel fibers, lie in multiple directions, such as for example in a fabric provided with braid.

The fiber volume fraction of the ductile steel fibers may be between 1 and 50% of the total amount of fibers, preferably (in view of the weight) between 1 and 20% fibers, most likely optimally between 3 and 10%.

The application can be used in composites with thermoplastic (eg PP, PE, PA, PET, PEEK, PEKK, PEI, PPS, etc.) matrices as well as thermoset (such as epoxy, polyurethane, polyester, vinyl ester, cyanate esters, phenol, etc.) matrices.

It is an advantage of hybrid composites according to embodiments of the present invention that they have a low specific weight and high stiffness. In particular, they have a high specific rigidity. Preferably, the ductile fibers have an almost as high stiffness as the brittle fibers, especially when (stainless) steel fibers are used, they have almost an as high stiffness as carbon fibers (200 GPa as compared to 235 GPa). This is in sharp contrast with other ductile fibers such as Dyneema, Kevlar, Curv, . . . . A redesign, according to embodiments of the present invention, allows to use less brittle fibers, eg carbon fiber, in a combination of ductile and brittle fibers such as e.g. a combination of steel fibers and carbon fibers.

It is an advantage of hybrid composites according to embodiments of the present invention to show a gradual ductile fracture behavior. In particular, they deform partially plastic during the fracture. When the brittle fibers, e.g. carbon fibers, break into the hybrid composite, the ductile fibers, e.g. (stainless steel), show plastic deformation, dissipate energy and keep it all together. In contrast, if a 100% carbon fiber composite breaks, then it breaks at once completely, without warning. As a result, embodiments of the present invention provide safer materials that do not exhibit a fragmentation effect and whose edges of fracture are less sharp. The use of "safe" ductile fibers, e.g. (stainless steel) fibers, would prevent the fracture and consequently reduce the safety risks.

It is an advantage of hybrid composites according to embodiments of the present invention that the integrity of the composite is retained after impact or overload. The components made with this hybrid material stay connected to each other after impact or overload. An impact or overload on a traditional composite has in most cases a complete break and individual sharp pieces as a result (often undesirable effect).

It is an advantage of hybrid composites according to embodiments of the present invention that structural residual mechanical properties of the composite are retained after impact or overload. After impact or overload, the residual properties are only partly lower than the properties prior to impact or overload. The material can thus still be structurally loaded after a damage. Hybrid components where, for example, Innegra or Curv fibers are added can also achieve a conservation of integrity, but because of the lower mechanical properties of the ductile fibers, the residual strength of the component is very low. The material still retains in one piece, but a second impact or load can not be handled anymore.

It is an advantage of embodiments of the present invention that possible damage to a hybrid composite according to embodiments of the invention can be visualized and detected. After an impact, due to the plastic deformation of the ductile fibers, e.g. steel fibers, the component will exhibit a permanent deformation which makes the damage visible (e.g., a denture), which is easily superficially inspected. Depending on the configuration and amount of steel fibers, the size of the denture may be investigated to estimate the amount of internal damage in the underlying carbon fiber composite. In order to measure the damage effectively, expensive measuring equipment must be used only locally.

With a traditional composite, damage after impact is often internal and not visible to the eye. This internal damage can only be traced through complex and expensive inspection techniques on the entire composite part (e.g. CT scan, ultrasound).

It is an advantage of the present invention, unlike the classic approach to hybridization where a low carbon fiber volume fraction (≤10%) is selected and where many ductile fibers are used, here a small fiber volume fraction of ductile fibers (cf. stainless steel fibers) can be used. The stress conditions and the way of breaking are different in that case, which allows to add ductile fibers, for example, only on the outside or outside surface (where the cracks are the largest). If the large amount of carbon fibers then breaks, then a tube made of the hybrid laminate will be severely damaged, but still retain integrity. In other words, you can cause a local big deformation or dirt in the tube, but the tube can still be bent (although the strength will be lower). It is an advantage of embodiments of the present invention that in tubes or sandwich panels, because of curvature and scale structure, less steel fibers are required. When impacting a tube, the stress condition is very local, more complex and less uniform than for a tensile or flexural test on a flat plate. With a flat plate, the material is pulled unilaterally completely, or by bending, easily pulled downwards and compressed at the top. Once a full-length rupture occurs, it is not possible to maintain full-length integrity for a limited amount of ductile fibers, such as in the traditional form of hybridization.

The hybrid material according to embodiments of this invention combines the best of both material classes. The hybrid material has high stiffness and low weight like traditional composites and will exhibit a ductile behavior at impact or overload. The component will not split into several pieces but remain a whole and, in addition, maintain a relatively high strength with reference to the strength before impact or overload compared to classical composite materials. In addition, an impact or overload will leave a permanent plastic deformation (=dirt), which greatly increases the visibility of the damage compared with classical composite materials.

Hybrid composites of embodiments of the present invention can preferably be used to make bicycles, and more specifically the front forks thereof. In the front forks, the result of a break is the most dramatic, which makes the safety aspect the biggest. The addition of steel fibers in front forks ensures that they do not break in a serious accident or heavy impact. This allows the cyclist to get home (for example, a type of front fork run-on-flat). The front fork will still have to be replaced, but a dramatic fall is avoided, and the cyclist can still ride a bike.

Furthermore, the hybrid composites that include steel fibers according to embodiments of the present invention could also be used in the automotive sector, where carbon fiber composites are currently more used e.g. as in consumer cars such as the BMW i3 and the new BMW 7 Series. Steel fibers can then be added to specific locations where the fracture behavior of carbon fiber composites is currently problematic. Currently, pipe structures are braided by Eurocarbon with carbon fibers, adding steel fibers would require substantially no changes in the production process. Other potential markets where long-term steel fibers can be used include aerospace, space and maritime sectors. In these sectors carbon fiber composites are already used extensively, but often very high safety factors are used to avoid breakage of the composite. In these sectors, steel fibers can also be added to specific components where the fracture behavior is problematic.

On the other hand, there are products in aviation where the critical load is a "tooldrop": dropping a tool from low-height onto a (typically very thin) carbon fiber laminate. In this case, it would be very easy to detect damage (or visualization of damage) to make structures even lighter because of it requires less overdimensioning. This is possible because the yield point of certain metallic fibers can occur approximately at the same elongation as the occurrence of cracks in carbon fibre composites.

Sports items can also be generated using hybrid composites according to embodiments of the present invention. For example golf sticks, tennis racket, canoes, boats, rowing panes, helmets, etc.

Another potential market is (machine) parts where breaking a carbon composite component would be dramatic for the entire machine, for example where the carbon composite pieces break other parts of the machine.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

SHORT DESCRIPTION OF THE DRAWINGS

The invention will now be described further, by way of example, with reference to the accompanying drawings.

Figure 4:
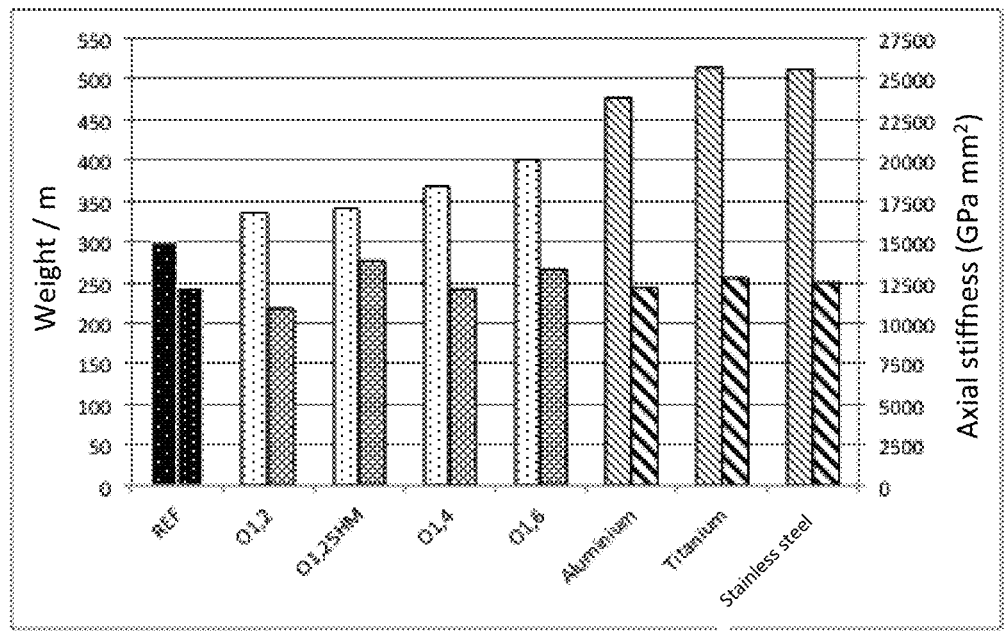

FIG. 4 shows the weight per length (left) and axial stiffness (right) of the reference carbon laminate, the produced hybrid laminates (O1.2; O1.25HM; O1.4 and O1.6) according to an embodiment of the present invention and according to conventional single metals whereby the wall thickness was adjusted to achieve the same axial stiffness.

Figure 5:
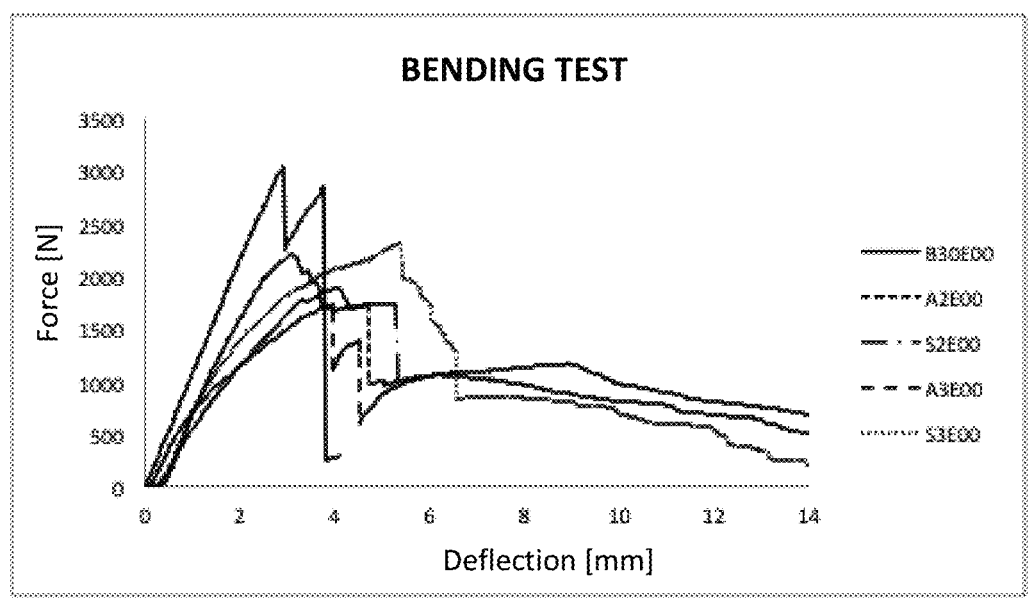

FIG. 5 shows the bending test force displacement diagram on the reference material (abbreviated as B30E00) and the hybrid laminates (A2, S2, A3 and S3) according to an embodiment of the present invention.

Figure 6:
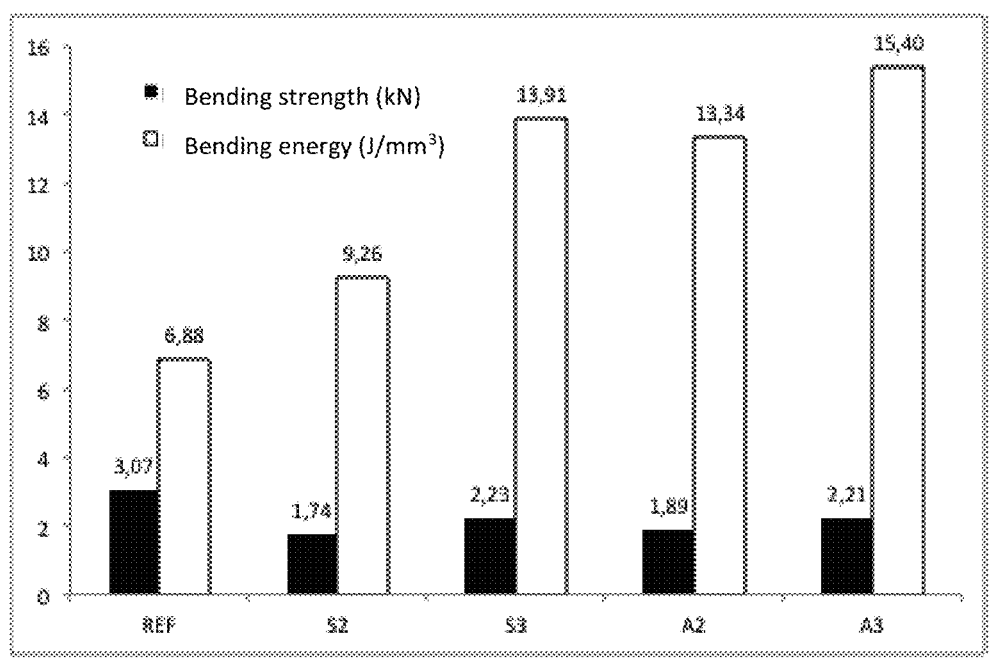

FIG. 6 shows a comparison of the bending strength (black) and the dissipated energy (white) during the bend test of the reference carbon fiber laminate and the hybrid laminates according to an embodiment of the present invention (S2, S3, A2 and A3).

Figure 7:

FIG. 7 shows the effect after an impact of 0 J, 4 J, 8 J and 16 J (top to bottom) on a reference carbon fiber laminate for illustrating advantages of embodiments of the present invention.

Figure 8:
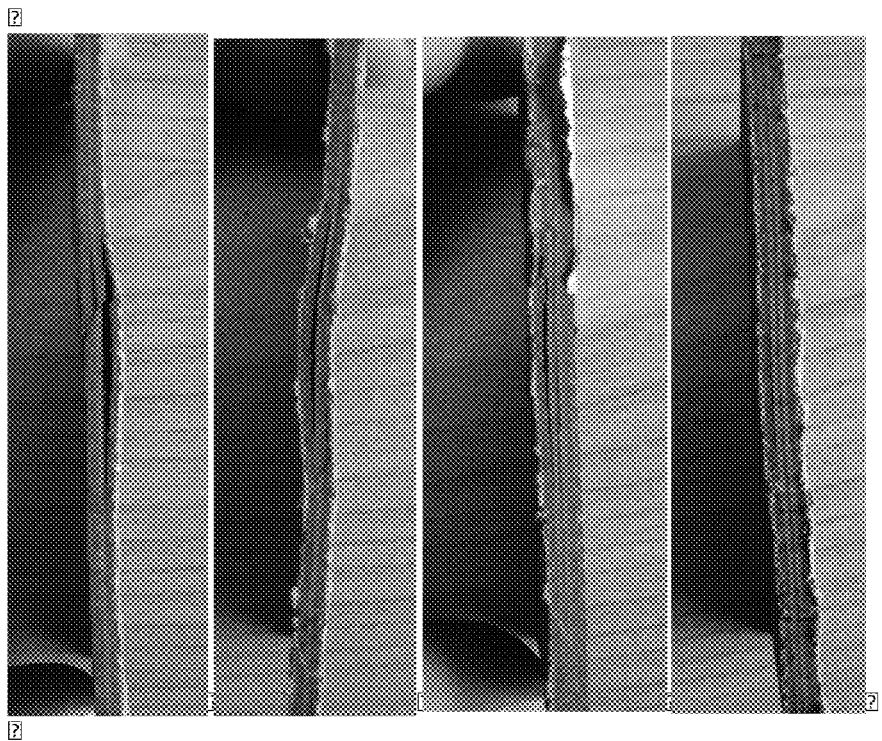

FIG. 8 shows hybrid laminates according to embodiment of the invention after an impact of 16 J (from left to right: A2, S2, A3, S3).

Figure 9:
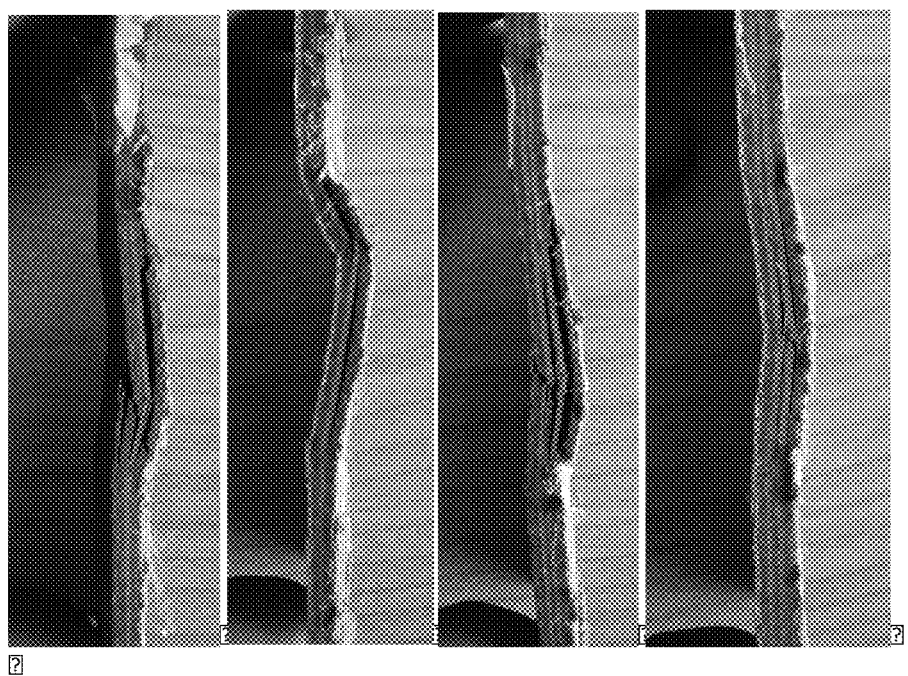

FIG. 9 shows hybrid laminates according to embodiment of the invention after impact of 32 J (from left to right: A2, S2, A3, S3).

Figure 10:
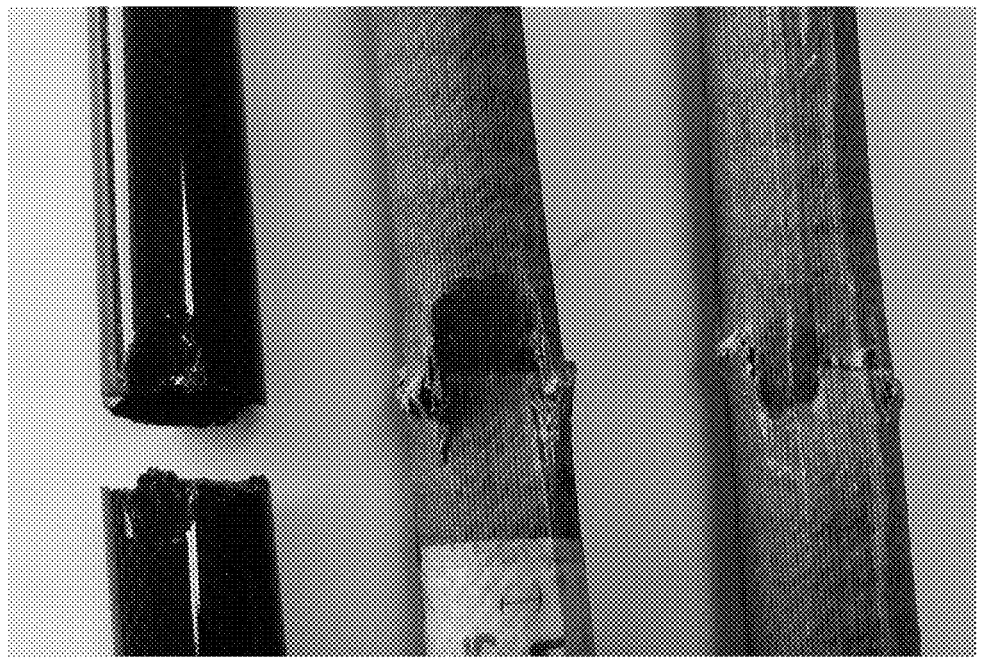

FIG. 10 shows the result of a 50 J impact on tubes, more specifically on a reference carbon fiber tube (left) and hybrid tubes according to an embodiment of the present invention, namely O1.25HM (middle) and O1.6 (right).

Figure 11:
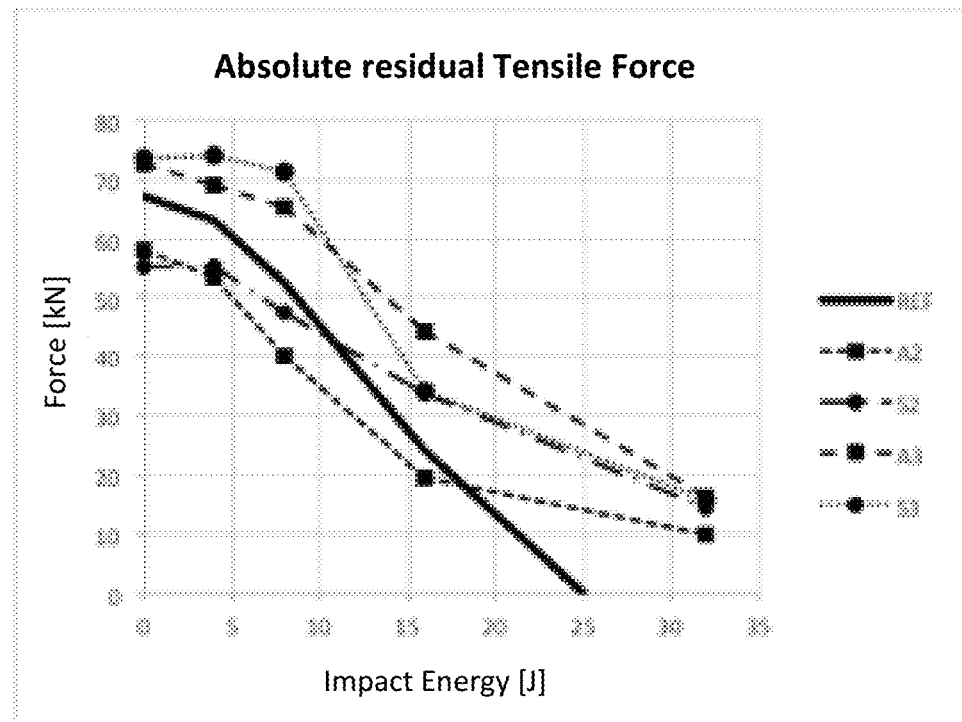

FIG. 11 shows the residual maximum force in the tensile test in function of the impact energy on a reference carbon fiber laminate (REF) and hybrid laminates according to an embodiment of the present invention (A2, S2, A3 and S3).

Figure 12:
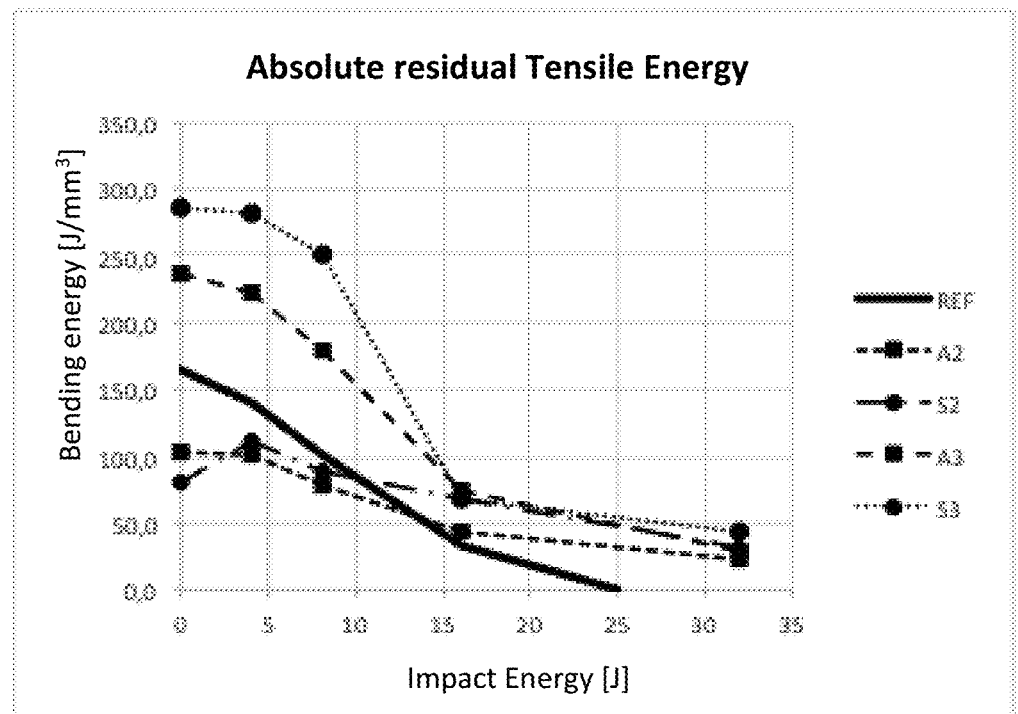

FIG. 12 shows the residual dissipated energy during a tensile test in function of the impact energy on a reference carbon fiber laminate (REF) and hybrid laminates according to an embodiment of the present invention (A2, S2, A3 and S3) prior to the tensile test.

Figure 13:
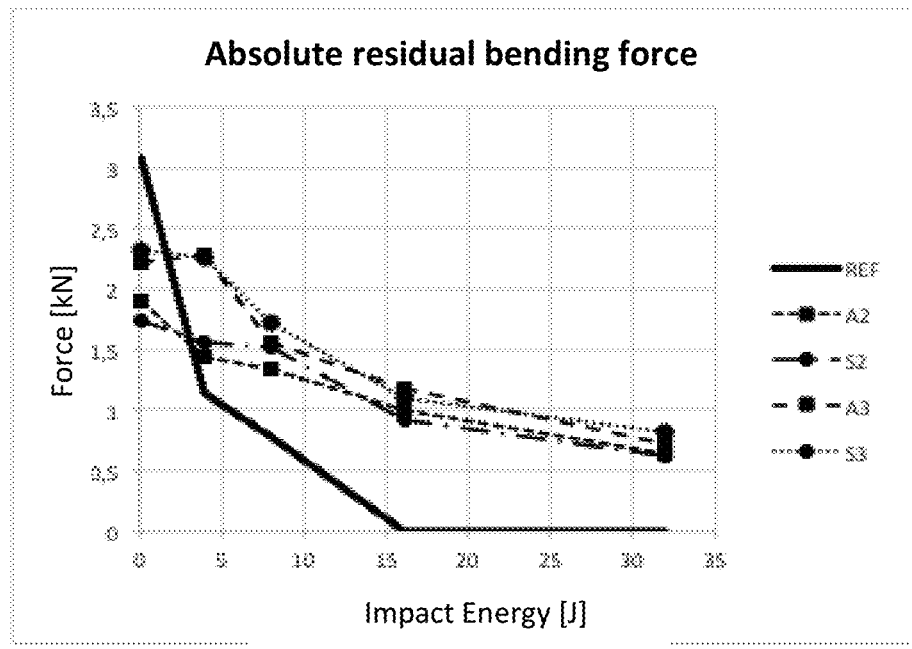

FIG. 13 shows the residual maximum force in the bending test in function of the impact energy on a reference carbon fiber laminate (REF) and hybrid laminates according to an embodiment of the present invention (A2, S2, A3 and S3).

Figure 14:
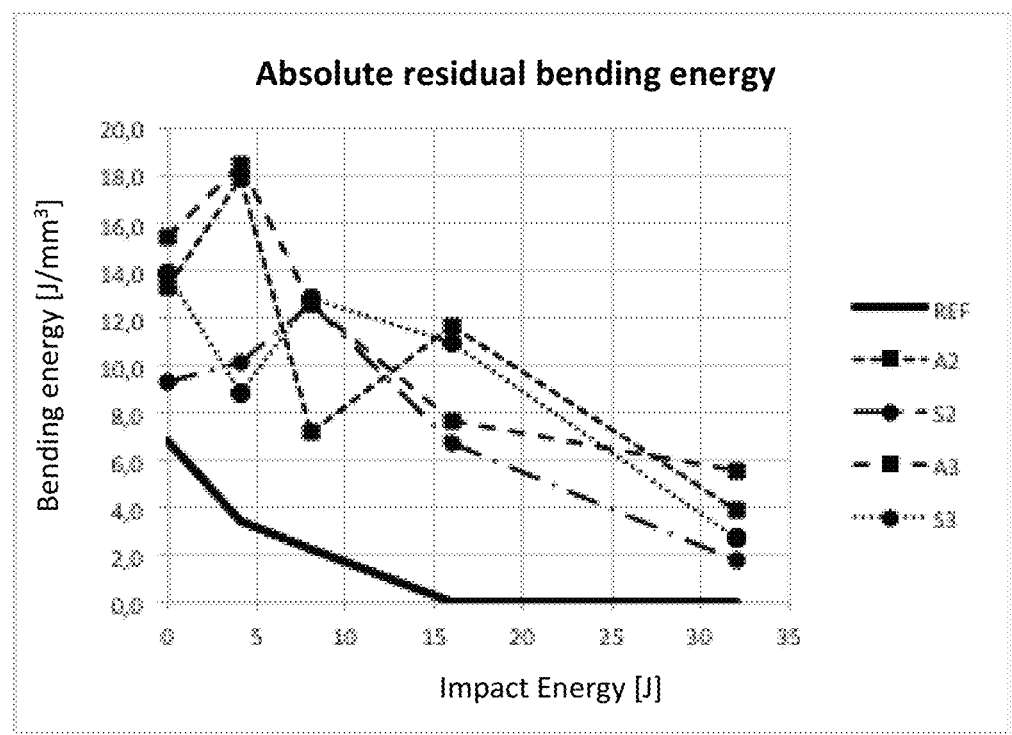

FIG. 14 shows the residual dissipated energy during the bending test in function of the impact energy on a reference carbon fiber laminate (REF) and hybrid laminates according to an embodiment of the present invention (A2, S2, A3 and S3) prior to the bend test.

Figure 15:
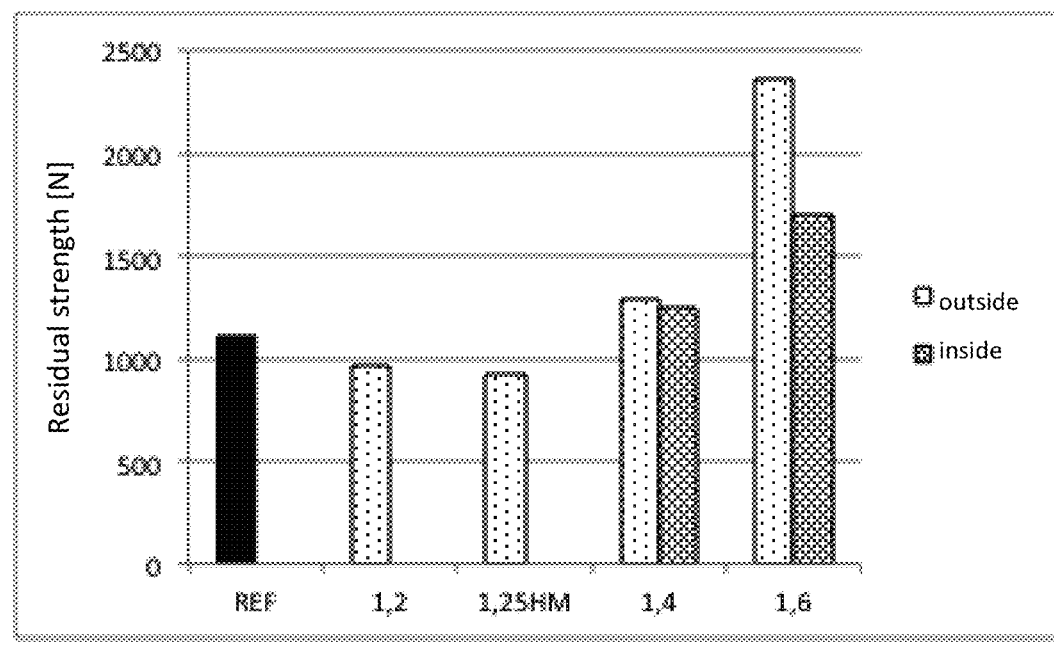

FIG. 15 shows the residual bending strength of tubes impacted by 30 J, more specifically on a reference carbon fiber tube (REF) and hybrid tubes according to an embodiment of the present invention (O1.2; O1.25HM; O1.4 and O1.6).

Figure 16:
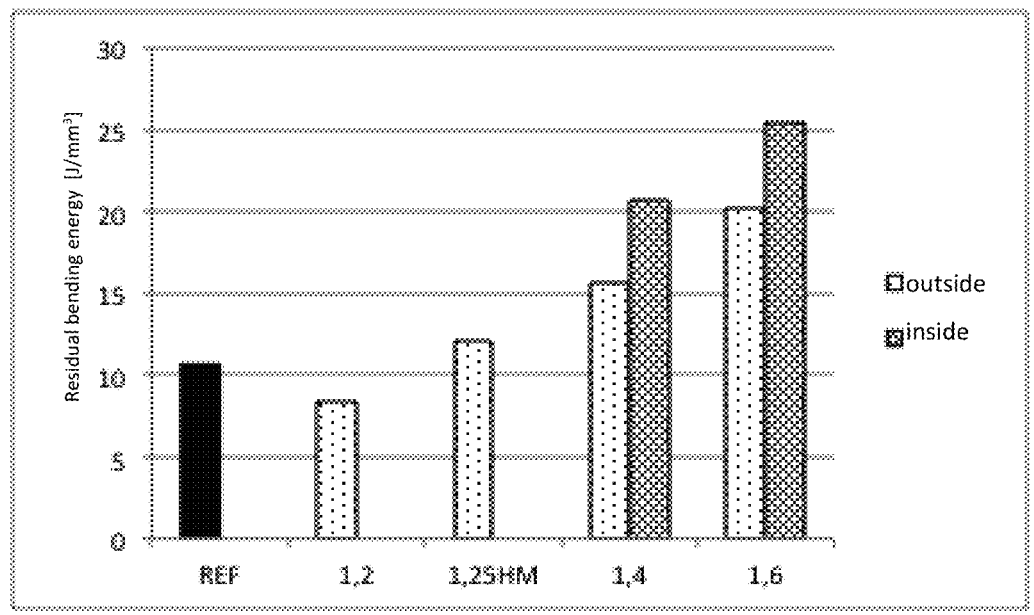

FIG. 16 shows the residual dissipated energy in a bending test of tubes that were impacted by 30 J, more specifically on a reference carbon fiber tube (REF) and current tubes (O1.2; O1.25HM; O1.4 and O1.6), illustrating an advantage of an embodiment of the present invention.

Figure 17:
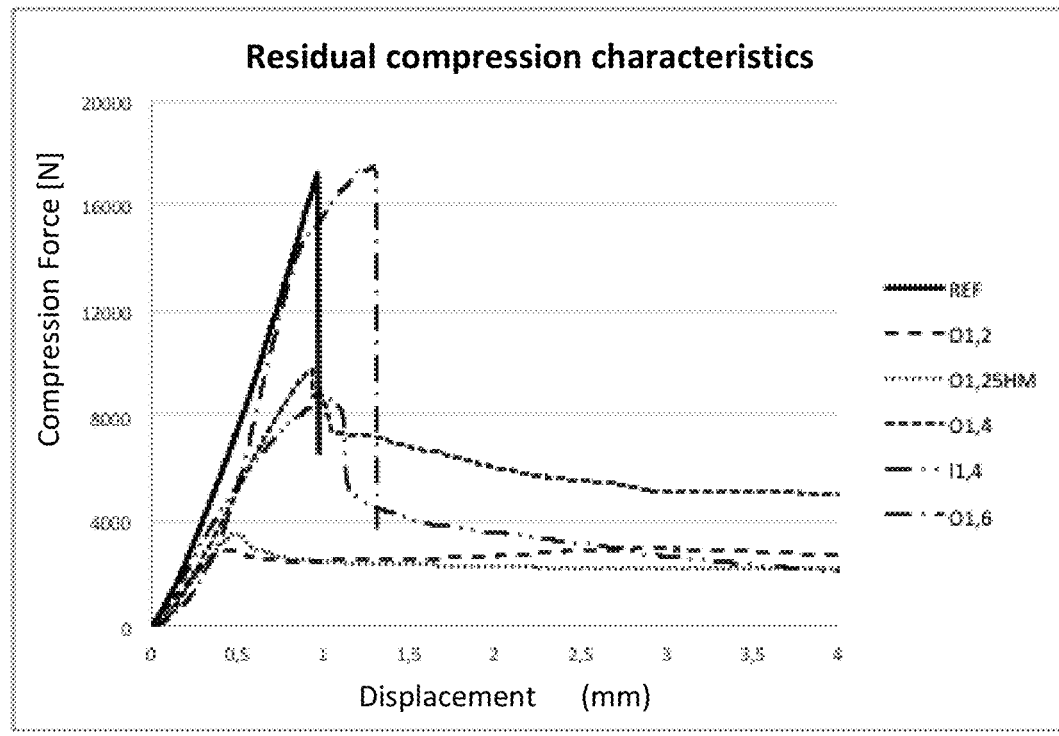

FIG. 17 shows the force displacement chart for the different compression tests on tubes that were impacted by 30 J, more specifically on a reference carbon fiber tube (REF) and current tubes (O1.2; O1.25HM; O1.4; I1.4 and O1.6) illustrating an advantage of an embodiment of the present invention.

Figure 18:
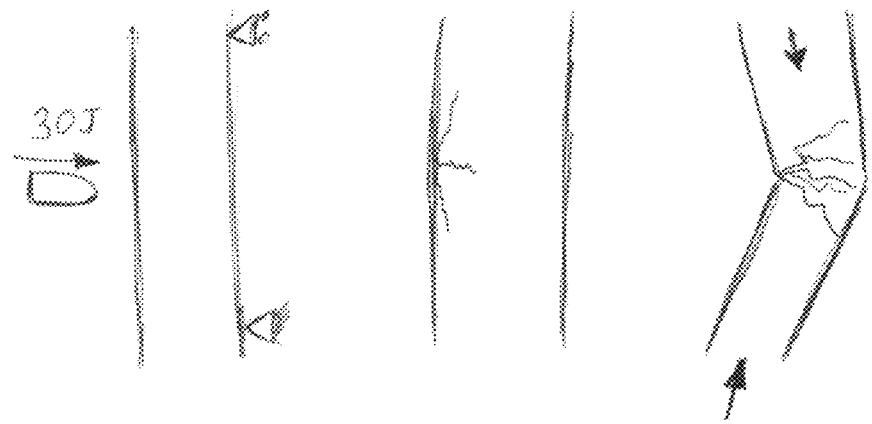

FIG. 18 shows a schematic representation of an impact on a reference carbon tube (left), the elastic return and damage after the impact (center), followed by the sudden failure in a compression test (right), illustrating an advantage of an embodiment of the present invention.

Figure 19:
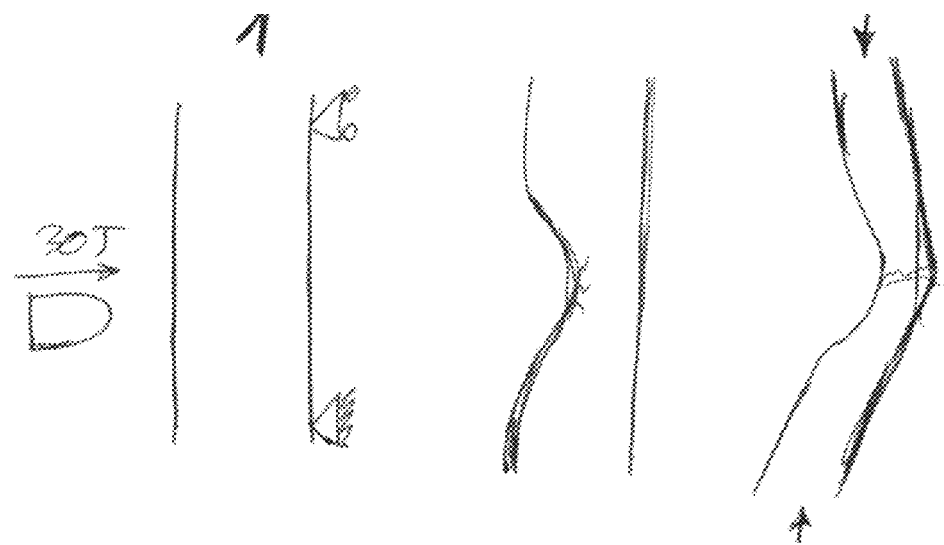

FIG. 19 shows a schematic representation of an impact on a hybrid tube according to the present invention with steel fibers (left), permanent plastic deformation and reduction in local section (center), followed by gradual smoothing in a compression test (right), illustrating an advantage of an embodiment of the present invention.

Figure 20:
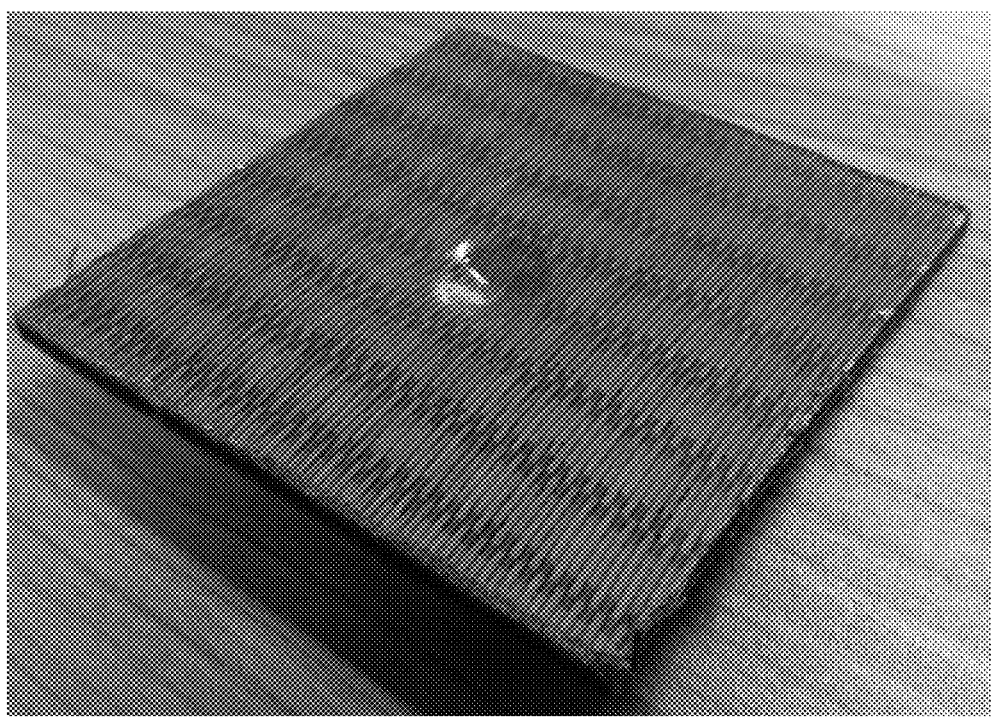

FIG. 20 shows a photograph of an impact laminate and the permanent deformation present as a result of the impact. In other words, FIG. 20 illustrates the damage illustrating an advantage of the present invention.

Figure 21A:
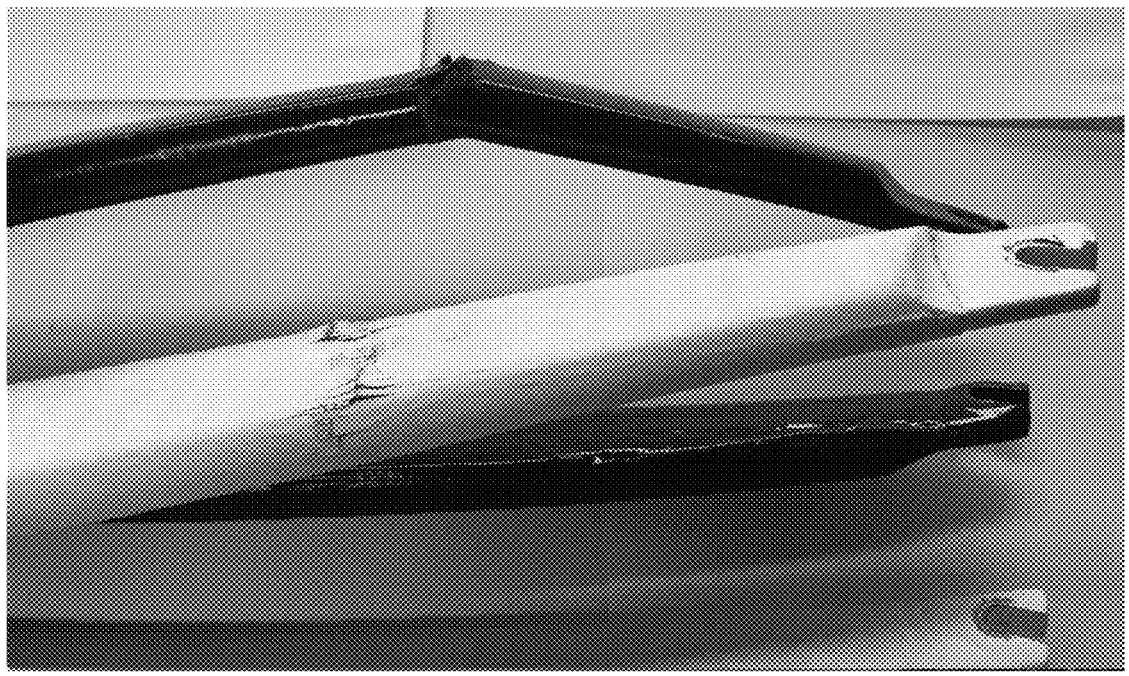
Figure 21B:
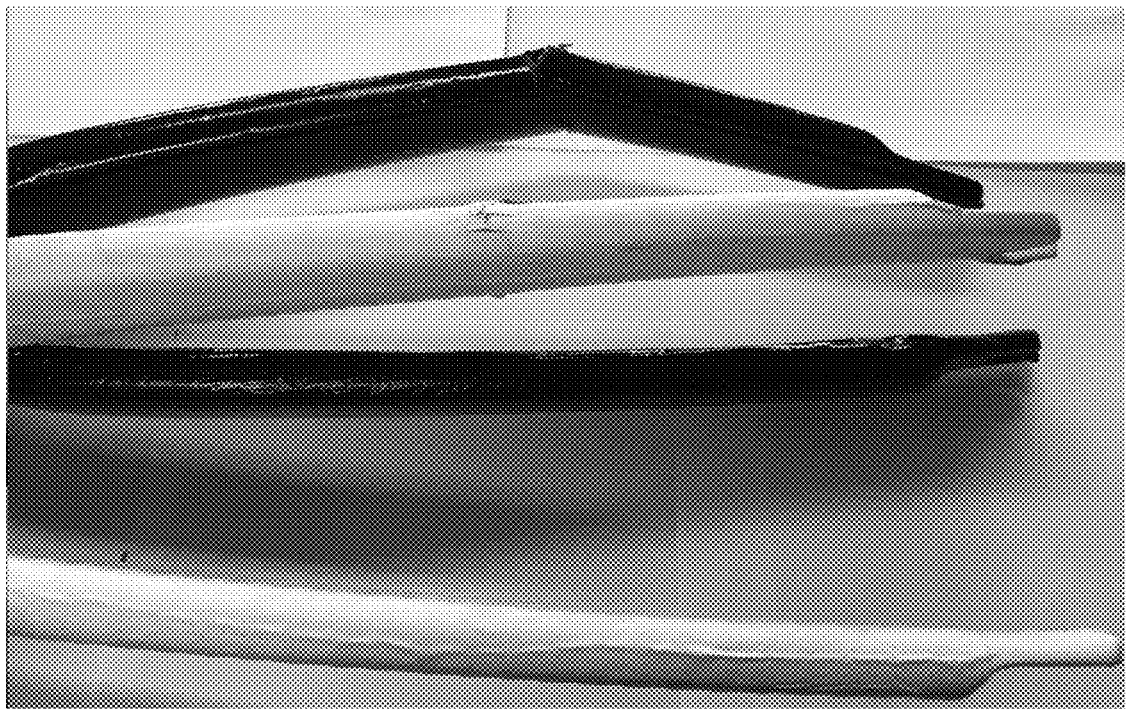

FIG. 21a-21b illustrate front forks for a bicycle made from a hybrid composite according to embodiments the invention in white and of a full carbon fiber variant.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION OF PARTICULAR EMBODIMENTS

The present invention will be described with respect to particular embodiments and with reference to certain drawings but the invention is not limited thereto but only by the claims.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under, front and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "laminate", this relates to a composite sheet material composed of different layers of a given material, obtaining properties which can not be obtained with single materials.

Where in embodiments of the present invention reference is made to "shrinkage", this relates to deformation in a direction perpendicular to the longitudinal direction of the fiber in a layer, structure or fabric.

Where in embodiments of the present invention reference is made to "integrity", this relates to a (hybrid) composite that retains its integrity after impact or overload, for example, the composite may be broken inside but still act as a whole. This may also relate to the structural integrity where the structural residual mechanical properties of the hybrid composites of the present invention are retained after impact or overload. These pieces of hybrid composites remain attached after impact or overload, and additionally they also have a certain (residual) mechanical performance. This is in contrast to, for example, a broken eggshell that can be held together by the thin fleece on the inside, but in no way can it be put under load anymore. After the impact, the structures have residual mechanical properties (strength, stiffness) and can even bear a second impact. Although the description provides only examples of plates and tubes (with a circular cross-section), embodiments of the present invention include objects with different shapes comprising the hybrid composite of embodiments of the present invention. This object may consist of the hybrid composite according to embodiments of the present invention or may include the hybrid composite (such as, for example, as a coating). Profiles may have an open (e.g., a C-profile) or closed cross-section, and may be hollow or filled. In preferred embodiments, the objects have a curvature improving the structural properties of the object.

Where in embodiments of the present invention reference is made to brittle and ductile fibers, these fibers are understood to have brittle and ductile properties, respectively, at standard conditions (room temperature and standard atmospheric pressure).

Where in embodiments of the present invention reference is made to the elongation at break reference is made to the percentage that a material extends relative to the initial length (technical elongation) at a burst or breaking load.

Where in embodiments of the present invention reference is made to rigidity, reference is made to the Young's modulus which has at least a value higher than a certain limit value.

Where in embodiments of the present invention reference is made to impact while maintaining integrity, reference is made to and impact with an energy of more than 4 J per millimeter thickness of the material being impacted whereby the material remains physically connected in one piece and the tensile strength (Mpa) in a damaged part still retains at least 5% of its original value.

Where in embodiments of the present invention reference is made to a twist angle made by a fiber, reference is made to the angle of an individual fiber relative to the longitudinal direction of the yarn or fiber bundle caused by a torsion applied to the yarn or fiber bundle.

In a first aspect, the present invention provides hybrid composites wherein hybridization with ductile fibers and preferably ductile stainless steel fibers is obtained. More particularly, the present invention relates to hybrid composites comprising ductile fibers that retain their integrity after impact or overload.

In the examples reference will be made to stainless steel fibers as ductile fibers, but embodiments are not limited thereto. The stainless steel fibers are preferably closely packed and show little shrinkage or no shrinkage, for example in a layer or are provided as a fabric. The stainless steel fiber fabric 100 is composed by using the steel fibers 1 as weft and the polyester yarn 20 as the warp. The steel fibers 1 are inserted into the fabric one by one on the warp, horizontally between the warp. These weft fibers (steel fibers) 1 are one by one perpendicular to the warp, horizontally between the warp, positioned in the fabric. The weft fibres (steel fibres) 1 are pressed close to each other in an untwisted manner and thus form a steel yarn 10 and thereby a fabric.

The stainless steel fiber fabric, thus preferably is a quasi-unidirectional fabric or structure using 1 yarn of 275 undistorted stainless steel fibers (316L) having a polygonal cross section (e.g., 30 μm diameter) as a weft yarn. The chain direction consists of a non-woven polyester (PET or PES) yarn with a high shrinkage. This is to ensure that the steel fibers are as straight and as well as possible oriented. This has a major influence on both the stiffness and the ductile behavior of the final composite. The steel fibers are oriented in each direction perpendicular to the direction in which cracking or breaking is expected (e.g., in a tensile load parallel to the load).

Figure 1A:
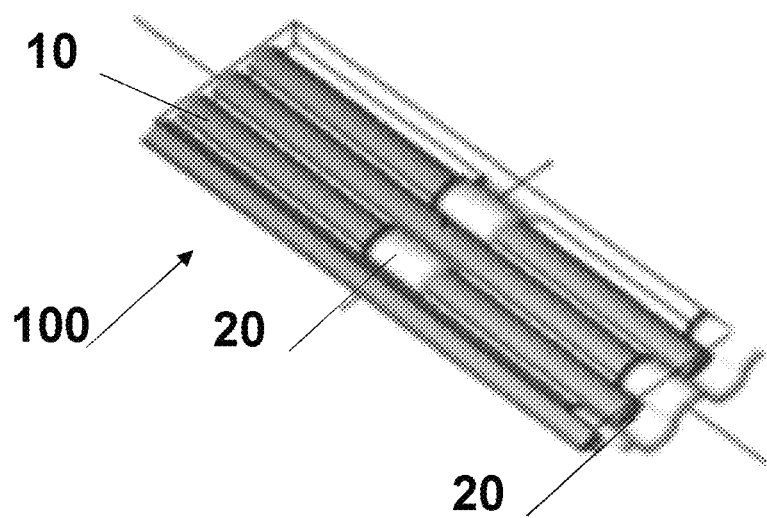
FIGS. 1a-1d show the tissue architecture used for embodiments of the present invention where stainless steel fibers are used as ductile fiber.
Figure 1B:
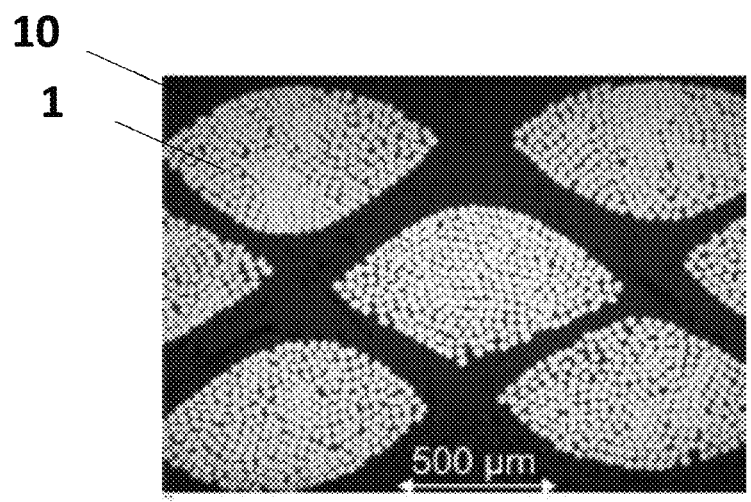
Figure 1C:
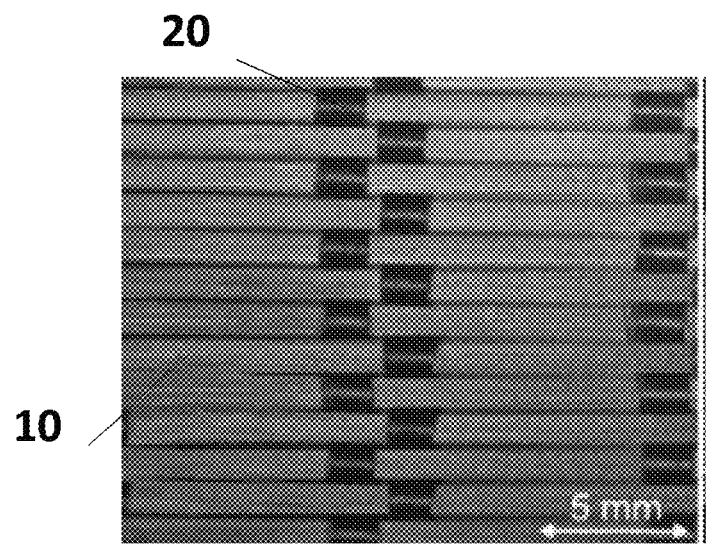
Figure 1D:
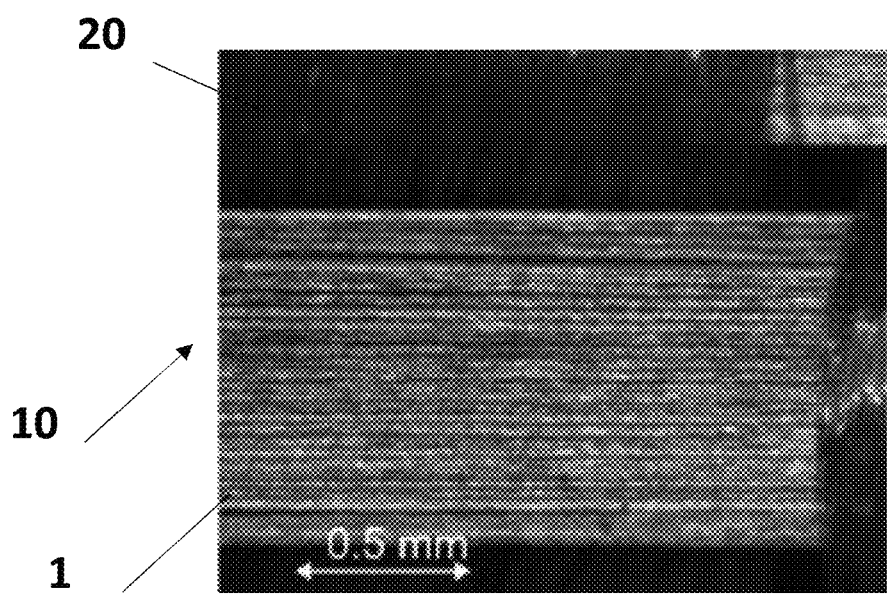

The stainless steel fiber fabric 100 according to embodiments of the invention is shown schematically in FIG. 1a, wherein the stainless steel yarn 10 comprising multiple untwisted steel fibers 1 is held straight by the untwisted polyester yarn 20. FIG. 1b illustrates microscopy images of cross-sectional views of some layers of stainless steel fiber fabric 100. Herein it is also clear that multiple stainless steel fibers are provided in a steel fiber yarn. FIG. 1c illustrates a plan view of the stainless steel fiber fabric 100 according to embodiments of the invention, a piece of which is zoomed in is illustrated in FIG. 1d. Tables 1 and 2 below provide more information about the steel fiber and steel fiber structure/fabric.

Table 1 below illustrates the characteristics of the steel fiber fabric used in accordance with embodiments of the invention:

| warp | Untwisted PET thread/yarn |
| --- | --- |
| weft | 275 fibers, 1520 tex |
| Tissue structure | Plain weave |
| Surface density [g/m2] | 1425 |
| Distance of warp [yarn/cm] | 1.25 |
| Distance of weft [yarn/cm] | 9.35 |
| Warp yarn | |
| thickness [mm] | 0.08 |
| width [mm] | 1.75 |
| Weft yarn | |
| thickness [mm] | 0.45 |
| width [mm] | 0.8 |

Table 2 below describes the mechanical properties of the stainless steel fibers (preferably having a diameter of 30 μm):

| | Stainless steel fibers |
| --- | --- |
| Young's modulus, E | ±193 GPa |
| Strength, σUTS | 660 ± 4 MPa |
| Elongation at break, εULT | ±20% |
| Yield strength (0.2%), σyield | ±365 MPa |

The carbon fiber fabric used in embodiments of the invention is a Hexcel fabric: a 2/2 twill fabric consisting of 3K yarns with AS2CJ carbon fibers having a surface weight of 160 g/m². The matrix material is an epoxy resin, more specifically an Araldite LY-1564-SP and the hardener is Aradur 3486-BD.

The hybrid composite according to embodiments of the invention is a hybrid composite plate material comprising various layers of alternating carbon fiber layer (comprising a carbon fiber fabric) and a stainless steel fiber layer (comprising a steel fabric). In the construction of the hybrid laminate, the steel fiber layer is preferably positioned on the outside each time. This because the greatest distortions occur on the outside in bending and impact, and these large deformations can then be captured by the steel.

In examples of embodiments of the invention, laminates are provided with only one or two layers of ductile fibers because of the heavy surface weight. But this is only a specific embodiment and other configurations can also be provided (for example, by spreading different thin ductile fibrous layers between the brittle fibrous layers).

Table 3 below shows the different plate laminates and configurations tested. In the case of an asymmetric (A2, A3) hybrid laminate according to embodiments of the invention, one layer of steel fibers was placed on the underside. In the case of the symmetrical laminates (S2, S3), both a steel fiber layer was provided at the top and a steel fiber layer on the underside. The reference plate does not comprise a steel fiber layer for hybridization and thus concerns a single carbon composite.

TABLE 3

Properties of the produced hybrid laminates according to the present invention and the reference carbon laminate.

| Type | abbreviation | % thickness of steel fibers layer vs overall thickness | Weight gain % | Volume % steel fibers | Overall thickness of the plate (mm) |
| --- | --- | --- | --- | --- | --- |
| Reference plate | REF | 0 | 0 | 0 | 4 |
| Symmetrical composition | S2 | 24 | 17 | 9.6 | 3.7 |
| | S3 | 20 | 32 | 8.0 | 4.4 |
| Asymmetrical composition | A2 | 12 | 1 | 4.8 | 3.7 |
| | A3 | 10 | 17 | 4.0 | 4.3 |

For example, the plates listed in Table 3 can be produced by vacuum infusion. Hereby, the dry (carbon and stainless steel) fibers are positioned on a flat plate and infused with a matrix material, for example epoxy resin, under vacuum to form a hybrid composite.

In addition to plates or sandwich structures comprising the hybrid composite according to the invention, embodiments of the invention also provide other shapes or profiles, such as, for example, I, C or H profiles or tubes comprising a curvature. Different types of tubes are also possible, such as tubes comprising different cross-sections (e.g., circular, square, polygon, etc.). It is an advantage of embodiments of the present invention that helps curvature to improve the structural mechanical characteristics (impact and residual strength) of the hybrid composite.

| Type | Abbreviation | % thickness of steel fiber layer relative to total thickness | Weight increase % | Volume % of steel fibers | Total thickness plate (mm) |
|---|---|---|---|---|---|
| Reference plate | REF | 0 | 0 | 0 | 2 |
| Steel fiber layer at the outside | O1.2 | 27 | 12 | 10.8 | 1.7 |
|  | O1.25HM | 26 | 13 | 10.4 | 1.75 |
|  | O1.4 | 24 | 23 | 9.6 | 1.9 |
|  | O1.6 | 22 | 34 | 8.8 | 2.1 |
| Steel fiber layer at the inside | I1.4 | 24 | 23 | 9.6 | 1.9 |
|  | I1.6 | 22 | 34 | 8.8 | 2.1 |

Table 4 below summarizes the characteristics of the produced hybrid tubes according to the present invention and the reference tube.

Table 4 illustrates the characteristics of hybrid tubes of circular cross-section according to embodiments of the invention and a reference carbon tube (which does not include stainless steel fiber). The tubes can also be produced using the above-mentioned vacuum infusion. In this case, a single layer of steel fibers is used, preferably on the outer surface of the tube, and the thickness is adjusted with respect to the number of layers of carbon fibers so that the outer diameter remains constant (32 mm) and the wall thickness (and weight) varies between the different tubes. In Table 4, the abbreviation "O" refers to a tube where the steel fibers are on the outside of the tube, for example an existing carbon composite tube, while the "I" refers to steel fibers being laminated on the inside of the tube. With abbreviation "O1.25HM" reference is made to high modulus carbon fibers (Torayca M40 J) used to obtain an increased stiffness and thus to obtain a similar stiffness with a lower wall thickness as the reference material. Embodiments of the present invention provide materials of low specific weight and high stiffness. Using the classical laminate theory and measured characteristics of steel fiber composites, the stiffness and weight of the hybrid composites according to embodiments of the invention can be calculated accurately.

Stiffness and Weight in Plate Structures According to Embodiments of the Invention In order to compare the stiffnesses and the relative density of different materials correctly, not only absolute material characteristics but also geometric effects are taken into account. The thickness and layer structure of the hybrid laminates is chosen so that the geometric tensile stiffness is similar or higher than the reference carbon fiber laminate. In other words, due to the addition of the steel fibers with high stiffness, the thickness of the laminate may be smaller (with a beneficial effect on weight) without affecting the deformation at a particular load. The thickness of the laminate in the case of A3 and S3 is similar or slightly higher, for even higher stiffness but with a higher weight gain.

By comparison, the same practice was applied to single aluminum, titanium and stainless steel: the thickness of the plate was chosen so that a certain force (in N) would yield a similar deformation (identical geometric stiffness). In this way, the effect on the weight can be compared directly.

Figure 2:
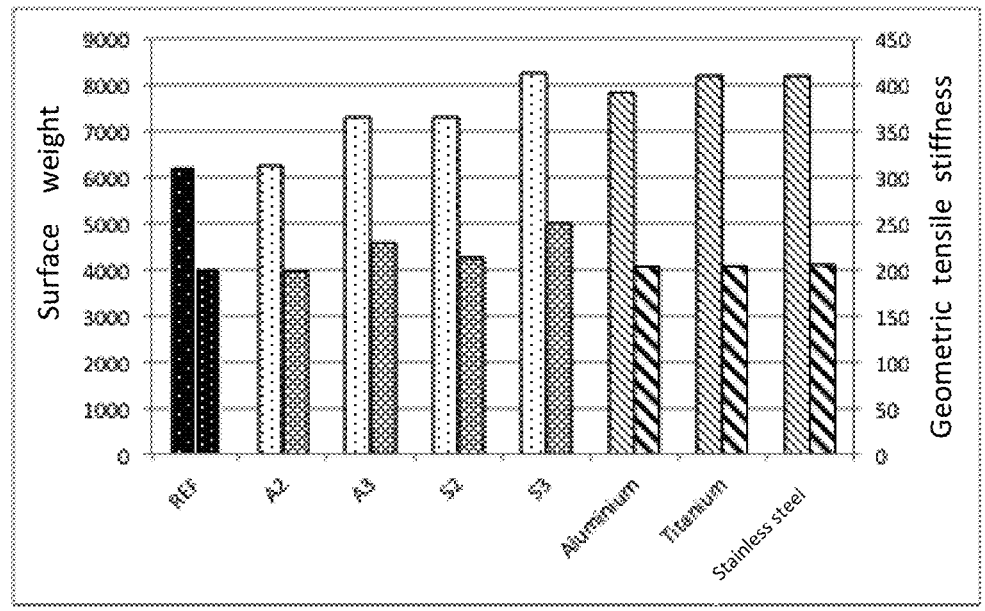
FIG. 2 shows the surface weight (left) and geometric tensile stiffness (right) of the reference carbon laminate, the produced hybrid laminates of embodiments of the present invention (A2, A3, S2 and S3) and conventional single metals, the plate thickness being adapted to achieve the same geometric tensile stiffness.

FIG. 2 illustrates the increase in weight for plates with a similar geometric tensile stiffness. A component designed with the hybrid structures (A2, A3 and S2) will show a limited weight gain (1-17%) relative to the reference material, but will still have a lower weight than the traditional metals. Single hybrid laminate S3 has a higher weight gain (32%) compared to the metals (26-31%), but was overly dimensioned (the geometric stiffness is 25% higher than the reference and the metals) (see Table 5).

| Abbreviation | Thickness t (mm) | Weight % increase (W %) | g/m2 | Material stiffness (Gpa) | Geometric stiffness (Gpa mm$^2$) |
|---|---|---|---|---|---|
| REF | 4 | 0 | 6234 | 50.5 | 202 |
| S2 | 3.7 | 17 | 7309 | 57.5 | 213 |
| S3 | 4.4 | 32 | 8255 | 56.7 | 250 |
| A2 | 3.7 | 1 | 6268 | 53.5 | 198 |
| A3 | 4.3 | 17 | 7282 | 53.2 | 229 |
| Aluminium | 2.9 | 26 | 7830 | 70.0 | 203 |
| Titanium | 1.85 | 31 | 8196 | 110.0 | 201 |
| Stainless steel (RVS) | 1.05 | 31 | 8190 | 195.0 | 205 |

Table 5 provides an overview of the weight gain, material and geometric stiffness of the reference carbon laminate, the produced hybrid laminates and traditional metals.

Figure 3:
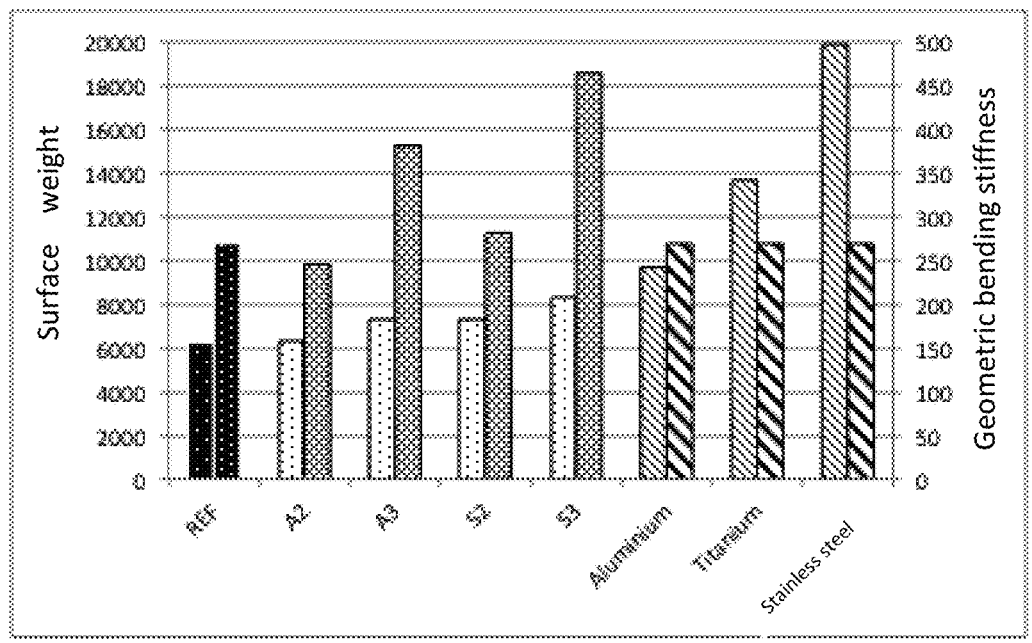
FIG. 3 shows the surface weight (left) and geometric bending stiffness (right) of the reference carbon laminate, the produced hybrid laminates of embodiments of the present invention (A2, A3, S2 and S3) and conventional single metals, the plate thickness being adjusted to achieve the same geometric bending stiffness.

A similar comparison can be made for the geometric bending stiffness (see FIG. 3). In this case, both laminates A3 and S3 are oversized. Because of the higher thickness, they have a geometric bending stiffness that is resp. 42% and 72% higher, but even these laminates have a lower weight than all metals.

Due to the high stiffness of the steel fibers on the outside, laminate A2 has almost the same geometric bending stiffness (−9%), without an increase in weight (+1%) relative to the reference carbon fiber material.

| Abbreviation | Thickness t (mm) | Weight gain % | g/m2 | Material stiffness (GPa) | Geometric stiffness (GPa mm4) |
|---|---|---|---|---|---|
| REF | 4 | 0 | 6234 | 50.5 | 269 |
| S2 | 3.7 | 17 | 7309 | 66.7 | 282 |
| S3 | 4.4 | 32 | 8255 | 65.4 | 464 |
| A2 | 3.7 | 1 | 6268 | 58.1 | 245 |
| A3 | 4.3 | 17 | 7282 | 57.6 | 318 |
| Aluminum | 3.6 | 55 | 9682 | 70.0 | 269 |
| Titanium | 3.1 | 119 | 13664 | 110.0 | 269 |
| Stainless steel (RVS) | 2.5 | 219 | 19879 | 195.0 | 269 |

Table 6 provides an overview of the weight gain, material and geometric stiffness of the reference carbon laminate, the produced hybrid laminates according to embodiments of the invention and conventional single metals.

Stiffness and Weight in Tube Structures (with a Circular Cross Section) According to Embodiments of the Invention The same theoretical calculation as used for the sheet structure can be applied to tube structures. Only the inner diameter (and thus the wall thickness) of the tube is adjusted to achieve the same axial stiffness. FIG. 4 illustrates that all hybrid pipes produced have a lower weight per running meter than the metal structures for the same axial stiffness. The weight gain in the current laminate structure is limited from 12% to 34%. The weight gain on metal tubes designed for the same axial stiffness is 60% to 72%.

| Abbreviation | Weight/m | Weight gain % | Wall thickness (mm) | Axial stiffness (GPa mm2) | % stiffness increase |
|---|---|---|---|---|---|
| REF | 299 | 0% | 2 | 12185 | 0 |
| O1.2 | 336 | 12% | 1.7 | 10880 | −11% |
| O1.25HM | 340 | 14% | 1.75 | 13816 | 13% |
| O1.4 | 369 | 23% | 1.9 | 12065 | −1% |
| O1.6 | 402 | 34% | 2.1 | 13265 | 9% |
| Aluminum | 477 | 60% | 1.8 | 12125 | 0% |
| Titanium | 514 | 72% | 1.2 | 12772 | 5% |
| Stainless steel (RVS) | 512 | 71% | 0.65 | 12483 | 2% |

Table 7 provides an overview of the weight per meter, wall thickness and axial stiffness of the reference carbon laminate, the produced hybrid tube structure laminates and traditional metals.

Gradual Ductile Fracture Behavior of Hybrid Plates According to Embodiments of the Invention The hybrid plates produced were tested in bending. The test was performed on an Instron 5985, with a 30 kN force cell. The width of the test samples is 30 mm with a span length of 150 mm. The displacement speed is 5 mm/min. The thickness of the test samples is given in Table 5 above. FIG. 5 illustrates the brittle fracture behavior for the reference carbon fiber laminate. After about 4 mm of deflection, the laminate breaks into 2 pieces. This is unlike all hybrid laminates which, after the occurrence of the first fractures in the carbon fibers, can still carry a force of about 1 kN even after a displacement of over 10 mm. In addition, the power displacement diagram for the hybrids shows a nonlinear gradient from about 2 mm deflection, which means that there is some kind of warning that the maximum strength is almost reached, in the form of permanent deformation. After reaching the maximum strength, the force drops, but more gradually than in the case of the reference carbon fiber laminate.

FIG. 6 shows that the absolute strength of the hybrid laminates is slightly lower than the reference carbon fiber laminate, but the energy dissipated during the deformation/breaking of the laminate is 35-125% higher. This energy dissipation is calculated as the area under the force displacement curve. It is important to mention that the values were not normalized according to the thickness of the material. This is because the plate thickness is adjusted to achieve the same geometric stiffness and thus with a higher material stiffness of the laminate a lower sheet thickness can be used (to reduce the absolute weight). This ensures that there is inherently less material (with laminates A2 and S2), with a logical consequence that the maximum strength is lower. However, this decrease in strength is compensated by the better fracture behaviour and the higher energy dissipation during fracture. In traditional composites, a design often becomes too strongly dimensioned because of the dramatic fracture behavior. The decrease in strength of the hybrid laminates will therefore not necessarily require another design, because of the strong improvements in fracture and energy dissipation.

Maintain Integrity of Hybrid Sheet Structures According to Embodiments of the Invention after Impact or Overload In case of a full carbon fiber laminate (and not hybrid), an impact from a certain energy level will break the carbon fiber laminate into two separate pieces. It is an advantage of embodiments of the invention due to the ductile behavior of the steel fibers, a hybrid laminate will even retain its integrity even with a high energy impact, i.e. the laminate is broken inside, but remains a whole.

To demonstrate this effect, laminates of 20 mm width were clamped into a Huntsman impactor. The impact was realized with a 20 mm diameter finger indentor and the clamp ring has an inside diameter of 40 mm. The impact setup is therefore a bending test with both sides clamped with a 40 mm span. FIG. 7 illustrates that at an impact of more than 16 J a full carbon fiber plate, which is brittle, breaks into 2 pieces.

FIG. 8 illustrates an example of hybrid laminates with steel fibers according to embodiments of the invention (left to right: A2, S2, A3, S3) after impact with the same energy at which the reference carbon fiber laminate breaks into 2 pieces (16 J) as described above and illustrated in FIG. 7. In all cases, the laminates remain in one piece. Internal in the carbon fiber reinforcement layers, fractures and delaminations occur, but these are held together by the steel fiber layers.

FIG. 9 illustrates an example of the hybrid laminates with steel fibers according to embodiments of the invention (from left to right: A2, S2, A3, S3) after a double energy impact with the reference carbon fiber laminate breaking into two pieces (32 J). Even with a double impact of energy, all steel fiber laminates remain a whole.

Maintain Integrity of Hybrid Tube Structures According to Embodiments of the Invention after Impact or Overload In order to demonstrate integrity in impacting hybrid tubes according to embodiments of the invention, tubes were impacted with an energy of 50 J. For this purpose, tubes with an outside diameter of 32 mm were laid on two support points 300 mm apart. The impact was realized with a 20 mm diameter finger indentor. The impact setup is therefore a 3-point bending test, with both sides laid free with a 300 mm span.

With an impact of 50 J, a full reference carbon fiber tube (i.e. not hybrid) completely breaks into two pieces. Based on the measured force displacement of the impactor, the energy absorbed during this impact can be measured: 37.9±4.6.6 J. In comparison to the reference carbon fiber tube, all hybrid tubes according to embodiments of the invention retain their integrity, i.e. they stay in one piece. The indentor leaves a permanent deformation and all impacted energy is dissipated in the tube. In addition, there are no sharp edges or pieces in the hybrid laminates in which the steel fibers are laminated on the outside as compared to the carbon fiber tube. This is also illustrated in FIG. 10, showing the result of a 50 J impact on the test tubes: reference carbon fiber tube (left), O1.25HM (middle) and O1.6 (right).

An important difference shown above is that the reference carbon fiber splits after a high impact in several pieces, while the hybrid laminates according to the invention stick together in one piece. This entails that the structural residual mechanical characteristics of the hybrid composites of embodiments of the present invention are retained after an impact or overload. These pieces of hybrid composites continue joining together after impact or overload and in addition they also have a certain mechanical performance. This is in contrast to, for example, a broken eggshell that can be held together by the thin membrane on the inside, but in no way can it be charged anymore. After impact, the structures still have residual mechanical characters (strength, rigidity) and can even bear a second impact.

Maintaining Structural Mechanical Properties after Impact on Sheet Structures

To demonstrate this effect, hybrid laminates according to embodiments of the present invention having a width of 20 mm were clamped into a Huntsman impactor. The impact was realized with a finger indentor having a diameter of 20 mm and the clamping was performed using a ring having an inner diameter of 40 mm. The impact setup is therefore a bending test with both sides of the material being clamped with a 40 mm span. The laminates were impacted with an energy of 4 J, 8 J, 16 J and 32 J and thereafter the residual mechanical properties were tested by means of a tensile test and a bending test.

The tensile test was performed on an Instron 4505 system with a span between the clamps of 150 mm and a displacement speed of 2 mm/min. The sample width used was 30 mm. The flexural/binding test was performed on an Instron 5985, with a 30 kN force cell. The width of the test samples was 30 mm, the span length is 150 mm. The displacement speed is 5 mm/min. The thickness of the test samples is given in Table 5.

FIG. 11 illustrates the retention of the residual tensile force in function of the impact energy on the sample for the tensile test. Again, the effect of the reduced thickness is strongly visible. The laminates S2 and A2 exhibit a lower maximum force in an unimpacted test sample (0 J). Also in the impact tests on laminates S2 and A2, the residual strength at low impact energies is lower than the reference material. This is caused, on the one hand, by impacting a thinner laminate, but on the other hand also because in the tensile test the diameter of the material is thinner because of the reduced thickness. Nevertheless, the decrease in tensile strength due to the impact is more gradual compared with the reference material. Additionally, all hybrid laminates according to embodiments of the present invention still have, after an impact of 32 J, about a quarter of the maximum tensile force in an unimpacted sample. This is in contrast to the carbon fiber laminate which can absorb up to only ±25 J and breaks into 2 or more pieces after impact with such energy level. If the thickness of the hybrid material is equal or higher, then the residual tensile strength of the hybrid material is in all cases higher than the reference material.

FIG. 12 illustrates, in function of the impact energy on the tensile test sample, how much energy can still be dissipated in a tensile test on an impacted sample. As with the maximum tensile force, the effect of the reduced thickness is important. Again, the decrease is more gradual for the hybrid laminates. For an impact of 16 J and higher, all hybrid laminates score better and these laminates can still dissipate ⅓ of energy relative to the reference laminate. A similar test was performed with a 3-point bending test as 2nd test. It is important that the load is applied in the same way: impact is measured in 3-point bending and residual properties are measured in 3-point bending. Because this is a similar load, the cracks that occur upon impact grow more easily. As a result, the power that still can be handled by the reference laminate (as illustrated in FIG. 13) decreases faster compared to the previous test. With an impact of 16 J, the laminate in the tensile direction has a residual strength. In bending, the maximum force is negligibly small.

The effect of the addition of the ductile fibers (e.g., steel fibers) is therefore more prominent. The steel fibers do not break during impact, but dissipate energy due to plastic deformation. When again applying a load in the same direction, the steel fibers can still bear a high load.

With an impact of 4 J on the reference laminate, the residual bending strength already drops to 37% of the initial bend strength. In the hybrid laminates, an impact of 32 J is required to realize a similar reduction in flexural strength.

As mentioned above, the energy that a hybrid laminate can dissipate during a bending test is much higher than for the reference laminate. This also remains the case after an impact (as illustrated in FIG. 14). At low energies, even small cracks and delaminations occur in carbon fiber layers which than gradually grow in the bending test, such that in some cases even more energy is dissipated during the flexure/binding test as compared to an unimpacted sample.

After an impact, the energy that can still be dissipated in a bending test is 126%-465% higher in the steel fiber hybrids.

Maintain Structural Mechanical Properties after Impact on Pipes

The same type of test is performed on hybrid tubes according to embodiments of the invention. In this case, tubes with an outside diameter of 32 mm were applied to 2 support points spaced 300 mm apart. The impact was achieved with a 20 mm diameter finger indentor and an impact energy of 30 J. Afterwards, a bend test with a 300 mm span is performed on an Instron 5985, with a 30 kN power cell. The displacement speed is 5 mm/min.

FIG. 15 illustrates the residual bending strength of the tubes after an impact of 30 J. In the case of the hybrid tubes "1.2" and "1.25HM", the wall thickness of the tubes is so lower than the reference tube that the residual strength is lower than the reference. This is again because there is less material to absorb the impact energy. If the wall thickness is only slightly lower ("1.4") or the same ("1.6") then the residual strength is a lot higher. With the tube O1.6, the residual bending strength after an impact of 30 J to 113% is higher.

If not the residual strength is compared, but the extent to which energy can be dissipated (as illustrated in FIG. 16), the effect is even greater. The tubes with a similar wall thickness can dissipate up to 140% more energy in the 3-point bending test after the 30 J impact.

FIG. 17 shows the power displacement chart of tubes subjected to a compression test after 30 J impact (with the same set-up).

The maximum force is only for tube O1.6 similar to the reference material. However, this is caused by a geometric effect. After the impact on the reference material, the tube returns to its original shape, with internal damage. When the tube is then loaded into compression, the damaged parts are pressed back together and only when the force is high enough the cracks grow rapidly and nods the tube (as illustrated in FIG. 18).

In the case of the hybrid tubes, residual deformation remains. At the place where there has been an impact, the geometry in the compression test is thus different from that in the reference material (as illustrated in FIG. 19). The permanent denture in the tube ensures that in a compression test the tube will already pinch smaller movements, so that no high force can be built up. This effect is clearly dependent on (and adjustable by) the wall thickness of the tube. The thin tubes have a greater permanent deformation which will only build the strength very little. However, in combination with the ductile fibers, the tubing will be gradual. The fall pattern is thus more advantageous relative to the reference material. The power that can be worn during knocking will not suddenly disappear (like the reference carbon tube), but gradually decrease.

In case of impact on a carbon fiber laminate or tube, the material will is resilient. The internal damage present is difficult or not visible.

An advantage of using the hybrid laminates according to embodiments of the invention is that possible damage (before complete breakage occurs) in the composite component is much easier to trace. Today, internal damage can only be traced through complex inspection techniques (eg CT scan, ultrasound). An impact load on a hybrid composite with steel fibers will not only cause internal damage but also leave a dirt in the composite component (as illustrated in FIG. 20), which is easy to inspect. Depending on the layout and amount of steel fibers, the size of the denture may be investigated to estimate the amount of internal damage in the underlying carbon fiber composite. In order to measure the damage effectively, only locally expensive measuring equipment must be used.

Steel fibers with the same fracture rake (or higher) but with a higher yield strength would yield a hybrid composite with greater energy dissipation at break. If the breaking elongation at a higher yield level is also lower, an optimum will exist between the two where the greatest energy dissipation occurs. Higher fractures are typically possible with higher diameters of steel fibers, while the yield strength of thermomechanical treatment is dependent.

In order to obtain a maximum result in the hybrid composite, at least the ductile fibers, e.g. steel fibers, should preferably be anchored in the matrix material as best as possible. This may be due to the rough surface of the bundled steel fibers, but this could also be applied mechanically or chemically. On the other hand, a coating can be used (e.g., with silanes) to obtain a better anchoring.

A preferred parameter is the local fiber volume fraction. With a high gasket, steel fibers may have a higher fracture elongation. It is therefore preferable, after the production of the fibers, to insert the fibers into the composite as much as possible in the same packing.

When structuring or fabrics are used (e.g., carbon fiber fabric or steel fabrics) to generate the hybrid composites, the lowest possible twist and shrinkage is preferred.

Hybrid composites according to embodiments of the present invention can be used, for example in tubular form, as a front fork of a bicycle. This is illustrated in FIGS. 21a and 21b. White is the hybrid variant according to the present invention, black is the full carbon fiber variant. The picture shows the improved effect of the hybrid composites in the tested front forks. The front forks were unilaterally supported on the steering tube and were impacted three times with 110 J. Again, it is important that the test set-up plays an important role in the energy that can be dissipated. Because the full front fork can elastically spring, much of the energy is transformed into elastic deformation. Therefore, the energy needed to cause such damage is that large.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A hybrid composite, the hybrid composite comprising:
a thermoplastic or thermoset matrix in which brittle fibers and ductile fibers are present,
wherein the ductile fibers are present individually or contained in a yarn having a twisting angle of less than 5° or being untwisted, each of the brittle fibers and the ductile fibers individually having a stiffness greater than 150 GPa, the ductile fibers having an elongation at break larger than 5%,
the fibers being configured such that the ductile fibers of the hybrid composite on impact or overload dissipate energy by plastic deformation of the ductile fibers and the hybrid composite retains integrity after impact or overload,
wherein the brittle fibers are carbon fibers and the ductile fibers are steel fibers.

2. The hybrid composite according to claim 1, wherein a fiber volume fraction of the ductile fibers is less than 50% of a total amount of fibers.

3. The hybrid composite according to claim 1, wherein the stiffness of each of the brittle fibers and the ductile fibers is larger than 190 Gpa and/or wherein the elongation at break of the ductile fibers is greater than 15%.

4. The hybrid composite according to claim 1, wherein the brittle fibers and the ductile fibers have a diameter of less than 100 μm and/or wherein the brittle fibers and the ductile fibers are packed.

5. The hybrid composite according to claim 1, wherein the brittle fibers and/or the ductile fibers have a rough and/or irregular surface.

6. The hybrid composite according to claim 1, wherein the ductile fibers comprise polygonal cross sections.

7. The hybrid composite according to claim 1, wherein the ductile fibers and/or the brittle fibers are placed unidirectionally in a homogeneous layer.

8. The hybrid composite according to claim 1, wherein the brittle fibers are provided in a fabric, a braid, a knit, a non-crimp fabric, or a random fiber mat.

9. The hybrid composite according to claim 1, wherein the ductile fibers are provided with their longitudinal axis perpendicular to an expected cracking direction of the composite.

10. The hybrid composite according to claim 1, wherein the ductile fibers are provided in a fabric.

11. The hybrid composite of claim 10, wherein a yarn with untwisted ductile fibers is used as weft yarn and wherein the warp yarn consists of an untwisted polymer yarn.

12. The hybrid composite according to claim 1, wherein the brittle fibers and the ductile fibers are provided in an interlayer configuration resulting in a hybrid laminate, with at least one ductile fiber layer.

13. The hybrid composite according to claim 12, wherein the at least one ductile fiber layer is positioned on at least one surface of the composite, where largest distortions can occur and where cracking can show a largest opening.

14. The hybrid composite according to claim 13, wherein the at least one ductile fiber layer is placed on at least one largest surface of hybrid composite.

15. The hybrid composite according to claim 1, wherein the composite is a laminate or sandwich plate or wherein the composite is a tube or a profile.

16. The hybrid composite of claim 15, wherein the composite is a tube or profile and wherein a curvature of the tube or profile contributes to the integrity of the hybrid composite.

17. A method of making a hybrid composite according to claim 1, the method comprising:
placing the brittle and ductile fibers on a mold of a predetermined shape;
infusing the fibers with a thermoplastic or thermoset resin to form a hybrid composite,
or the method comprising:
providing an object containing brittle fibers,
providing at least one ductile fiber layer on at least one surface of the object.

18. A hybrid composite, the hybrid composite comprising:
a thermoplastic or thermoset matrix in which brittle fibers and ductile fibers are present, wherein the ductile fibers are present individually or contained in a yarn having a twisting angle of less than 5° or being untwisted, each of the brittle fibers and the ductile fibers individually having a stiffness greater than 150 GPa, the ductile fibers having an elongation at break larger than 5%, the fibers being configured such that the ductile fibers of the hybrid composite on impact or overload dissipate energy by plastic deformation of the ductile fibers and the hybrid composite retains integrity after impact or overload, wherein the brittle fibers are carbon fibers and the ductile fibers are steel fibers, and wherein the hybrid composite forms a vehicle component.

19. A hybrid composite, the hybrid composite comprising:

a thermoplastic or thermoset matrix in which brittle fibers and ductile fibers are present, wherein the ductile fibers are present individually or contained in a yarn having a twisting angle of less than 5° or being untwisted, each of the brittle fibers and the ductile fibers individually having a stiffness greater than 150 GPa, the ductile fibers having an elongation at break larger than 5%, the fibers being configured such that the ductile fibers of the hybrid composite on impact or overload dissipate energy by plastic deformation of the ductile fibers and the hybrid composite retains integrity after impact or overload, wherein the brittle fibers are carbon fibers and the ductile fibers are steel fibers, and wherein the hybrid composite forms a bicycle component.

* * * * *